United States Patent
Tage et al.

(10) Patent No.: US 9,528,593 B2
(45) Date of Patent: Dec. 27, 2016

(54) STRUCTURE FOR LUBRICATING TRANSMISSION

(71) Applicant: MAZDA MOTOR CORPORATION, Hiroshima (JP)

(72) Inventors: Shinya Tage, Hiroshima (JP); Noriyuki Wada, Hiroshima (JP); Yasuki Okadome, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/781,215

(22) PCT Filed: Feb. 7, 2014

(86) PCT No.: PCT/JP2014/000669
§ 371 (c)(1),
(2) Date: Sep. 29, 2015

(87) PCT Pub. No.: WO2014/155934
PCT Pub. Date: Oct. 2, 2014

(65) Prior Publication Data
US 2016/0033028 A1 Feb. 4, 2016

(30) Foreign Application Priority Data

Mar. 29, 2013 (JP) .................................. 2013-070907

(51) Int. Cl.
*F16H 57/04* (2010.01)
*F16H 3/089* (2006.01)

(52) U.S. Cl.
CPC .......... *F16H 57/0423* (2013.01); *F16H 3/089* (2013.01); *F16H 57/043* (2013.01);
(Continued)

(58) Field of Classification Search
CPC .. F16H 57/0423; F16H 57/0482; F16H 3/089; F16H 57/0494; F16H 57/0457; F16H 57/043; F16H 2200/0052
See application file for complete search history.

(56) References Cited

U.S. PATENT DOCUMENTS 1,441,857 A * 1/1923 Johnson .................. F16N 39/06
184/11.3
4,242,923 A * 1/1981 Nishikawa ............. B60K 17/08
184/6.12
(Continued)

FOREIGN PATENT DOCUMENTS

| JP | S62-016534 Y2 | 4/1987 |
| JP | H04-285356 A | 10/1992 |

(Continued)

OTHER PUBLICATIONS

English Translation of International Preliminary Report on Patentability issued in PCT/JP2014/000669, mailed Nov. 5, 2015.
(Continued)

*Primary Examiner* — David J Hlavka
(74) *Attorney, Agent, or Firm* — Studebaker & Brackett PC

(57) ABSTRACT

An oil feeding member (100), catching oil picked up by a gear, includes a gutter guiding the oil from one end to the other end of a transmission in its axial direction. The gutter is comprised of a first gutter (131) and a second gutter (132). A portion of the oil feeding member closer to the one end includes a catching wall (124) standing between the first and second gutters, catching the oil picked up by a speed change gear (21, 22) serving as the gear, and guiding the oil into the first gutter. A transmission case (2) includes a guiding portion (150) guiding, into the second gutter, the oil picked up by the speed change gear and deposited on a ceiling surface (2*c*) of the transmission case.

11 Claims, 9 Drawing Sheets

(52) U.S. Cl.
CPC ..... *F16H 57/0457* (2013.01); *F16H 57/0482* (2013.01); *F16H 57/0494* (2013.01); *F16H 2200/0052* (2013.01)

(56) References Cited

U.S. PATENT DOCUMENTS

| | | | | |
|---|---|---|---|---|
| 6,458,053 | B1* | 10/2002 | Hill | F16H 57/0482 |
| | | | | 474/91 |
| 8,919,500 | B1* | 12/2014 | Kilcrease | F01M 9/06 |
| | | | | 184/11.5 |
| 9,103,432 | B2* | 8/2015 | Isomura | F16H 57/0423 |
| 2007/0175728 | A1* | 8/2007 | Aoyama | F16H 57/0423 |
| | | | | 192/113.3 |
| 2010/0319486 | A1* | 12/2010 | Kawamoto | F16H 57/0423 |
| | | | | 74/665 L |
| 2011/0214947 | A1* | 9/2011 | Tuomas | F16H 57/0423 |
| | | | | 184/6.12 |
| 2012/0096968 | A1* | 4/2012 | Kawamoto | F16H 57/0409 |
| | | | | 74/467 |
| 2013/0283955 | A1* | 10/2013 | Araki | F16H 57/0423 |
| | | | | 74/467 |

FOREIGN PATENT DOCUMENTS

| | | |
|---|---|---|
| JP | 2006-71038 A | 3/2006 |
| JP | 2011-137493 A | 7/2011 |
| JP | 2011-185332 A | 9/2011 |

OTHER PUBLICATIONS

International Search Report issued in PCT/JP2014/000669, mailed Apr. 22, 2014.
Written Opinion issued in PCT/JP2014/000669 mailed Apr. 22, 2014.

* cited by examiner

STRUCTURE FOR LUBRICATING TRANSMISSION

TECHNICAL FIELD

The present invention relates to a structure for lubricating a transmission and, in particular, to a structure for lubricating a manual transmission using a gear that picks up oil.

BACKGROUND ART

Lubrication of a manual transmission involves feeding lubricating oil to, for example, bearings for an input shaft and an output shaft, meshing engagements of speed change gears, and loosely-fitting engagements for gears provided for the input and output shafts and a synchronizer. Such oil is typically fed by oil pick-up feeding. Specifically, the oil stored on the bottom of a transmission case is picked up by rotating gears, received by a gutter-shaped oil-feeding member, and then fed to each of those parts to be lubricated.

For example, Patent Document 1 discloses an oil feeding apparatus that is included in a transmission case combined with a case for a differential gear system, and used for a vehicle having a front-engine, front-wheel-drive (FF) layout. The oil feeding apparatus picks up oil with a large-diameter differential ring gear which is arranged at the lowest internal portion of the transmission case and which provides power from the transmission to the differential gear system. Then, the oil feeding apparatus introduces this oil from the front (near the engine) of the transmission to a storage member (oil-feeding member) arranged above input and output shafts such that the oil is poured into a storage part of the storage member. After that, the oil feeding apparatus guides the oil to the rear (across from the engine) of the transmission to allow the oil to drip from an oil-dripping hole which is cut through the bottom of the storage part, to the input shaft, the output shaft, the meshing engagements of the speed change gears, and the synchronizer, as well as to feed the oil from a rear end of the input shaft to an intra-shaft oil passage inside the input shaft.

The oil feeding apparatus disclosed in Patent Document 1, however, primarily uses the differential ring gear to feed the picked up oil to each of the parts to be lubricated. Thus, the oil feeding apparatus cannot sufficiently catch the picked up oil in the storage member when the vehicle is moving backward; that is, when the differential ring gear is rotating in the reverse direction. Hence, when the vehicle is reversed, each of the parts to be lubricated could be fed with the oil in an insufficient amount.

In contrast, Patent Document 2 discloses the use of driven gears that are loosely fitted to an output shaft, which is positioned lower than an input shaft, and in particular, the use of a driven gear having a relatively large diameter and included in a gear train for a transmission gear range of forward and low speed. The rotation of this driven gear allows the oil stored on the bottom of a transmission case to be picked up, and then caught in an oil gutter (i.e., oil-feeding member).

This allows the driven gear (which is loosely fitted to the output shaft and included in the gear train for the transmission gear range of forward and low speed) to rotate in the same direction when the vehicle moves backward as well as forward. As a result, even when the vehicle moves backward, the oil can also be picked up, caught by the oil-feeding member, and then fed to each of those parts to be lubricated.

CITATION LIST

Patent Document

PATENT DOCUMENT 1: Japanese Unexamined Patent Publication No. 2011-185332
PATENT DOCUMENT 2: Japanese Unexamined Patent Publication No. 2011-137493

SUMMARY OF THE INVENTION

Technical Problem

In order to improve the fuel efficiency of engines, manual transmissions are required to reduce the amount of oil stored in a transmission case to the point that the vehicle's weight and oil agitation resistance caused by, for example, a differential ring gear can be reduced sufficiently. Therefore, the amount of the stored oil should be reduced as much as possible as long as it is possible to ensure that a lower portion of the gear, which picks up the oil, is dipped into the oil stored on the bottom of the transmission case.

Here, the driven gear, which is included in the gear train for the transmission gear range of forward and low speed, could pick up the oil. Even so, if the differential ring gear cannot pick up the oil when the vehicle is moving backward, for example, the oil-feeding member will not catch so large an amount of oil. In that case, it will be even more difficult to secure a required amount of oil for parts that should be lubricated in the transmission if only an insufficient amount of oil can be stored on the bottom of the transmission case.

In view of the foregoing background, it is therefore an object of the present invention to provide a transmission-lubricating structure that allows for feeding reliably a required amount of oil to a part to be lubricated while minimizing the amount of oil stored in the transmission case.

Solution to the Problem

In order to achieve this object, the present invention is directed to a structure for lubricating a transmission. The structure includes an oil-feeding member arranged in a transmission case, and configured to catch oil picked up by a gear. The oil feeding member is provided with a gutter and is configured to guide the oil through the gutter from one end to the other end of the transmission in an axial direction and to feed the oil to a part to be lubricated located closer to the other end in the transmission case. The gutter of the oil feeding member is comprised of a first gutter and a second gutter arranged parallel to each other. A portion of the oil feeding member closer to the one end is provided with a catching wall standing between the first and second gutters, the catching wall being configured to catch the oil picked up by a speed change gear and guide the oil into the first gutter, and the speed change gear being arranged beside the oil feeding member closer to the first gutter and serving as the gear. The transmission case includes a guiding portion configured to guide, into the second gutter, the oil that the speed change gear has picked up which has been deposited on a ceiling surface of the transmission case.

With such a structure adopted, the oil picked up by the speed change gear arranged beside a portion of the oil feeding member with the first gutter and caught by the catching wall is guided into the first gutter and fed to a predetermined part to be lubricated via the first gutter. On the other hand, the oil picked up by the speed change gear and guided by the guiding portion is guided into the second gutter and fed to another part to be lubricated via the second gutter. In that case, the oil to be guided by the guiding portion into the second gutter has been picked up by the speed change gear and deposited on the ceiling surface of the transmission case. Thus, for example, even when the vehicle is moving backward (i.e., even when just the oil picked up by the speed change gear may be fed), this structure allows a required amount of oil to be fed to the other part to be lubricated to which the oil is fed via the second gutter. This reduces the need for increasing the amount of oil to be stored on the bottom of the transmission case so that the oil will be fed as needed to the other part to be lubricated, thus enabling this structure to feed a required amount of oil to a part to be lubricated while minimizing the amount of the oil stored.

Note that the oil picked up by the speed change gear and deposited on the ceiling surface of the transmission case runs through a gap between the ceiling surface and the upper end of the catching wall, and flows towards the second gutter. Considering various factors such as the dimensional tolerance of each part of the oil-feeding member and the case and the surface roughness of the ceiling surface of the case, the oil-feeding member needs to be provided such that an upper end of the catching wall does not contact with the ceiling surface. This inevitably creates the gap between the upper end of the catching wall and the ceiling surface. Consequently, it can be said that the guiding portion takes advantage of the gap thus left.

In an embodiment of the structure for lubricating a transmission, the part to be lubricated may include a part located on a primary shaft serving as an input shaft for the transmission, and a part located on a secondary shaft extending parallel to the primary shaft. The first gutter may be configured to feed the oil to the part located on the primary shaft, and the second gutter may be configured to feed the oil to the part located on the secondary shaft.

Such an embodiment allows for feeding a required amount of oil to both the primary and secondary shafts that transmit power, even if, for example, the vehicle is moving backward, that is, even when just the oil picked up by the speed change gear may be fed.

In another embodiment of the structure for lubricating a transmission, the speed change gear may include first and second speed gears on the secondary shaft extending parallel to the primary shaft serving as the input shaft of the transmission. The guiding portion may include a rib provided on the ceiling surface of the transmission case. The rib may extend in the axial direction of the transmission in a range covering the first and second speed gears on the secondary shaft.

Such an embodiment allows the guiding portion to guide, into the second gutter, a largest possible percentage of the oil that has been picked up by the first and second speed gears on the secondary shaft (i.e., driven gears included in a gear train for a transmission gear range of forward and low speed) and deposited on the ceiling surface of the transmission case.

In still another embodiment of the structure for lubricating a transmission, a portion of the second gutter closer to the one end may be provided with an oil introducing portion, into which introduced is the oil picked up by a differential ring gear located beside the oil feeding member and closer to the second gutter. The oil feeding member may include a communicating passage configured to guide a part of the oil into the first gutter, the oil having been introduced into the oil introducing portion of the second gutter.

Such an embodiment allows the differential ring gear to introduce a large amount of oil into the second gutter, for example, when the vehicle is moving forward, that is, when the oil picked up by the differential ring gear is catchable. This contributes to excellently lubricating the part to be lubricated to which the oil is fed via the second gutter. Furthermore, the communicating passage guides, into the first gutter, a part of the large amount of oil that has been introduced into the second gutter. This thus allows a sufficient amount of the oil to be fed to both of the parts to be lubricated to which the oil is supplied via the first and second gutters, respectively.

Advantages of the Invention

As can be seen from the foregoing description, a structure for lubricating a transmission according to the present invention includes a gutter which is provided to an oil feeding member catching oil picked up by a gear, and guides the oil from one end to the other end of the transmission in an axial direction. The gutter is comprised of a first gutter and a second gutter arranged parallel to each other. A portion of the oil feeding member closer to the one end is provided with a catching wall standing between the first and second gutters. Here, the catching wall is configured to catch the oil picked up by a speed change gear and guide the oil into the first gutter, and the speed change gear is arranged beside the oil feeding member closer to the first gutter and serving as the gear. The transmission case includes a guiding portion configured to guide, into the second gutter, the oil that the speed change gear has picked up which has been deposited on a ceiling surface of the transmission case. Such features allow for less need for increasing the amount of oil to be stored in the transmission case to feed the oil to the part to be lubricated to which the oil is supplied through the second gutter, and thus enable feeding reliably a required amount of oil to a required part to be lubricated while minimizing the amount of oil stored in the transmission case.

DESCRIPTION OF EMBODIMENTS

Embodiments of the present invention will now be described in detail with reference to the drawings.

Figure 1:
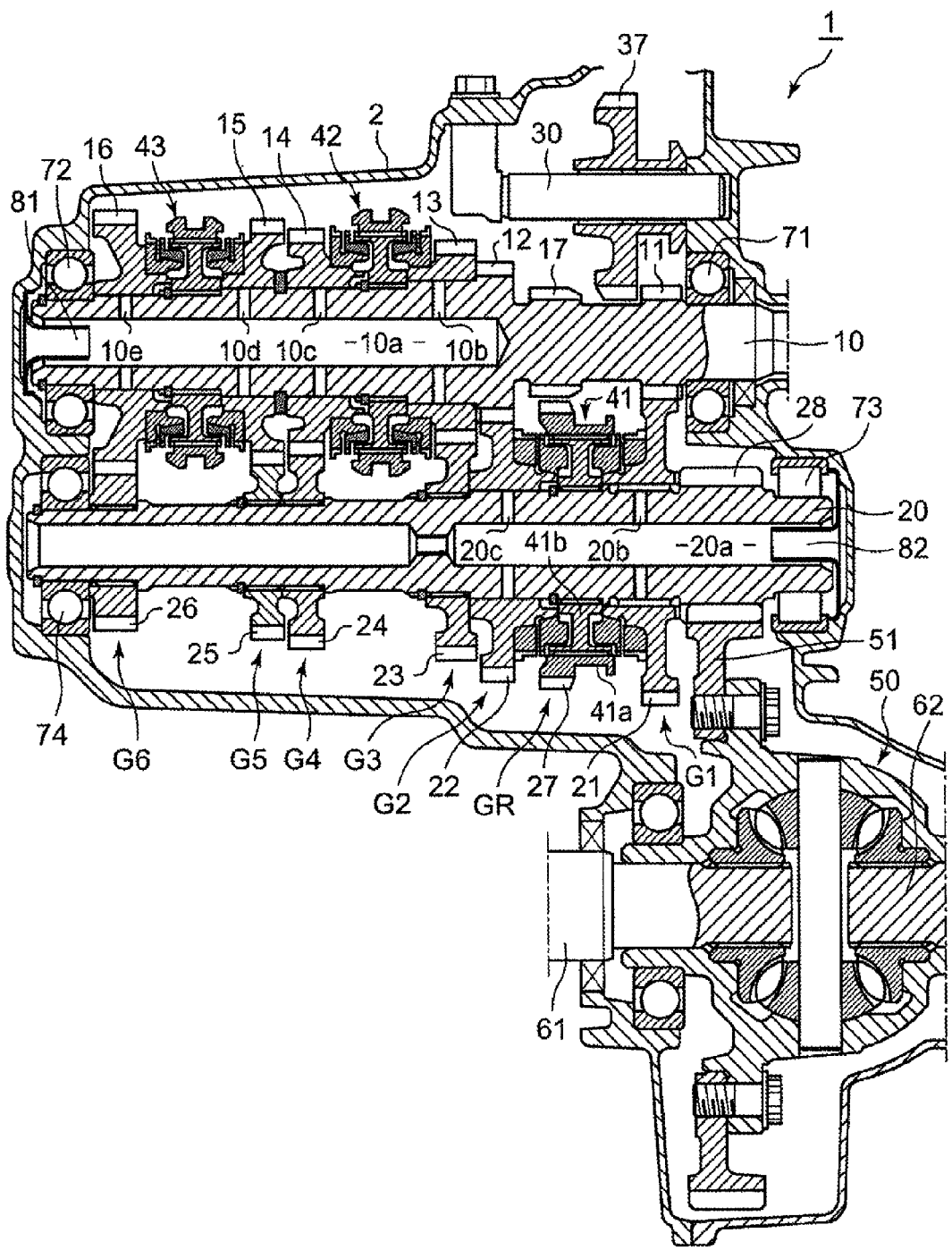
FIG. 1 is a developed cross-sectional view illustrating a basic structure for a transmission which adopts a lubricating structure according to an embodiment of the present invention.

First, the structure of a transmission 1 which adopts a lubricating structure according to this embodiment will be described with reference to FIG. 1. An engine (not shown) is arranged on the right-hand side of the paper on which FIG. 1 is drawn with respect to the transmission 1. The engine provides power to a primary shaft 10 that is connected to an output shaft of the engine via a clutch and that acts as an input shaft of the transmission 1. The direction in which the primary shaft 10 extends (i.e., the horizontal direction in FIG. 1) is the axial direction of the transmission 1. The front end of the transmission 1 faces the engine (i.e., located on the right-hand side of FIG. 1) in the axial direction of the transmission 1, and the rear end of the transmission 1 is opposite from the engine (i.e., located on the left-hand side of FIG. 1). In the following description, the front and rear of the transmission 1 will be hereinafter simply referred to as a "front" and a "rear", respectively.

The transmission 1 is mounted laterally in the engine room in a front portion of a vehicle such that its axial direction is parallel to the width direction of the vehicle.

In this embodiment, the transmission 1 is a six-speed-plus-reverse manual transmission. The primary shaft 10 and a secondary shaft 20 are arranged in a transmission case 2 (hereinafter simply referred to as a "case 2") of the transmission 1. Here, the secondary shaft 20 is arranged parallel to the primary shaft 10 and acts as the output shaft of the transmission 1. Furthermore, between the primary shaft 10 and the secondary shaft 20, a plurality of gear trains are arranged in the following order from the front end toward the rear end: a gear train G1 for first speed gear; a gear train GR for reverse gear; a gear train G2 for second speed gear; a gear train G3 for third speed gear; a gear train G4 for fourth speed gear; a gear train G5 for fifth speed gear; and a gear train G6 for sixth speed gear. The power provided from the engine to the primary shaft 10 is transmitted to the secondary shaft 20 via one of these seven gear trains.

The gear train G1 for first speed gear includes a primary gear 11 for first speed gear secured to the primary shaft 10, and a secondary gear 21 for first speed gear loosely fitted to the secondary shaft 20. The gear train G2 for second speed gear includes a primary gear 12 for second speed gear secured to the primary shaft 10, and a secondary gear 22 for second speed gear loosely fitted to the secondary shaft 20. Moreover, the gear train G3 for third speed gear includes a primary gear 13 for third speed gear loosely fitted to the primary shaft 10, and a secondary gear 23 for third speed gear secured to the secondary shaft 20. The gear train G4 for fourth speed gear includes a primary gear 14 for fourth speed gear loosely fitted to the primary shaft 10, and a secondary gear 24 for fourth speed gear secured to the secondary shaft 20. The gear train G5 for fifth speed gear includes a primary gear 15 for fifth speed gear loosely fitted to the primary shaft 10, and a secondary gear 25 for fifth speed gear secured to the secondary shaft 20. The gear train G6 for sixth speed gear includes a primary gear 16 for sixth speed gear loosely fitted to the primary shaft 10, and a secondary gear 26 for sixth speed gear secured to the secondary shaft 20.

The gear train GR for reverse gear includes a primary gear 17 for reverse gear secured to the primary shaft 10, a secondary gear 27 for reverse gear secured to the secondary shaft 20, and an intermediate gear 37 for reverse gear fitted to an intermediate shaft 30 arranged parallel to the primary shaft 10 and the secondary shaft 20. Here, the intermediate shaft 30 is slidable along its own axis.

Furthermore, a synchronizer 41 for first and second speed gears is arranged between the secondary gear 21 for first speed gear and the secondary gear 22 for second speed gear that are loosely fitted to the secondary shaft 20. A synchronizer 42 for third and fourth speed gears is arranged between the primary gear 13 for third speed gear and the primary gear 14 for fourth speed gear that are loosely fitted to the primary shaft 10. A synchronizer 43 for fifth and sixth speed gears is arranged between the primary gear 15 for fifth speed gear and the primary gear 16 for sixth speed gear that are loosely fitted to the primary shaft 10. Thus, when the operator operates a gear stick (not shown) to cause sleeves of these synchronizers 41 to 43 to slide toward the front or rear, a loosely-fitted gear to which a sleeve is slid is locked to the primary shaft 10 or the secondary shaft 20. Then, the gear train of the locked gear gets ready to transmit power.

The secondary gear 27 for reverse gear in the gear train GR for reverse gear is provided for a sleeve 41a of the synchronizer 41 for first and second speed gears. The secondary gear 27 for reverse gear rotates with the secondary shaft 20 via a hub 41b of the synchronizer 41 for first and second speed gears. Then, when the operator operates the gear stick to cause the intermediate gear 37 for reverse gear to slide toward the rear, the intermediate gear 37 for reverse gear gets engaged with the primary gear 17 for reverse gear and the secondary gear 27 for reverse gear. As a result, the gear train GR for reverse gear gets ready to transmit power.

The secondary shaft 20 has an output gear 28 at its front end. The output gear 28 is engaged with a differential ring gear 51 acting as an input gear of a differential gear system 50. This enables the rotation of the secondary shaft 20—that is, power generated by the rotation of the transmission 1—to be transmitted to a left axle 61 and a right axle 62 via the differential gear system 50. These axles 61 and 62 are connected to the left and right front wheels, respectively.

The primary shaft 10 has two bearings 71 and 72 arranged at the front and rear ends of the primary shaft 10. The primary shaft 10 is rotatably supported by the case 2 via these bearing 71 and 72. The secondary shaft 20 also has two bearings 73 and 74 arranged respectively at front and rear ends of the secondary shaft 20. The secondary shaft 20 is rotatably supported by the case 2 via these bearings 73 and 74.

Moreover, the primary shaft 10 also has an intra-shaft oil passage 10a and oil passages 10b to 10e. The intra-shaft oil passage 10a extends along the axis of the primary shaft 10 from the rear end toward the front end thereof. The oil passages 10b to 10e radially extend outward from the intra-shaft oil passage 10a to form openings through the surface of the primary shaft 10 to which the primary gears 13 to 16 for third to sixth speed gears are loosely fitted. Behind the bearing 72 is a funnel 81 attached to a rear wall 2b (see FIG. 7) of the transmission case 2 and inserted into the intra-shaft oil passage 10a from the rear of the transmission 1.

Likewise, the secondary shaft 20 also has an intra-shaft oil passage 20a and oil passages 20b and 20c. The intra-shaft oil passage 20a extends along the axis of the secondary shaft 20 from the front end toward the rear end thereof. The oil passages 20b and 20c radially extend outward from the intra-shaft oil passage 20a to form openings through the surface of the secondary shaft 20 to which the secondary gears 21 and 22 for first and second speed gears are loosely fitted. In front of the bearing 73 is a funnel 82 attached to a front wall of the transmission case 2 and inserted into the intra-shaft oil passage 20a from the front of the transmission 1.

Figure 2:
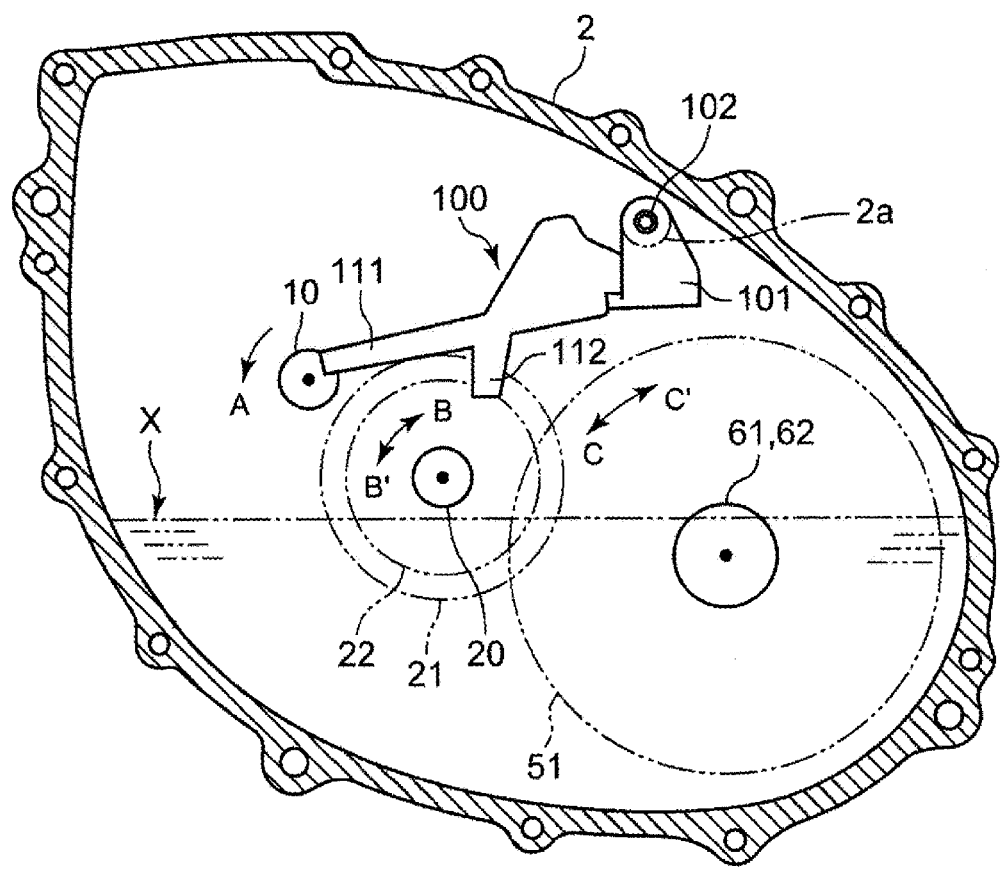
FIG. 2 is a general rear view of the transmission, illustrating an arrangement of an oil-feeding member in the transmission.

As illustrated in FIG. 2, when the vehicle is moving forward, the primary shaft 10 rotates in a direction A, the secondary shaft 20 rotates in a direction B, and the differential ring gear 51 rotates in a direction C. On the other hand, when the vehicle is moving backward, the primary shaft 10 also rotates in the same direction A as when the vehicle is moving forward. Meanwhile, when the vehicle is moving backward, the secondary shaft 20 and the differential ring gear 51 respectively rotate in the opposite directions B' and C' from the ones when vehicle is moving forward.

Note that when the vehicle is moving backward, the secondary gears 21 and 22 for first and second speed gears provided on the secondary shaft 20 and always engaged with the primary gears 11 and 12 for first and second speed gears that are secured to the primary shaft 10 rotate in the same direction B as when the vehicle is moving forward.

Furthermore, when the vehicle is moving forward, the secondary gear 27 for reverse gear, which is included in the gear train GR for reverse gear arranged between the gear trains G1 and G2 for first and second speed gears, rotates in the same direction B as the secondary gears 21 and 22 for first and second speed gears. On the other hand, when the vehicle is moving backward, the secondary gear 27 for reverse gear rotates in the opposite direction B' from the one when the vehicle is moving forward.

Furthermore, when the transmission 1 is in the neutral position while the vehicle is at a stop, for example, the secondary gears 21 and 22 for first and second speed gears on the secondary shaft 20 rotate in the direction B, since the primary shaft 10 rotates in the direction A, just like when the vehicle is moving forward and backward.

Here, as indicated by the reference sign X in FIG. 2, oil is stored on the bottom of the case 2 to the point that respective lower portions of the differential ring gear 51 and the secondary gears 21 and 22 for first and second speed gears are immersed in the oil while the transmission 1 is operating. Likewise, a lower portion of the secondary gear 27 for reverse gear is also immersed in the oil stored on the bottom of the case 2.

Next, a lubricating structure according to this embodiment will be described. Basically, this lubricating structure is provided in order to feed each of the parts to be lubricated with oil in the middle to rear end portions of the transmission 1 in the axial direction. Note that parts arranged at the front end of the transmission 1 are sufficiently fed with the oil stored on the bottom of the case 1 and picked up by the rotations of the differential ring gear 51, and the secondary gears 21, 22 and 27 for first and second speed gears and reverse gear, of which the lower parts are immersed in the oil. Here, those parts include the bearings 71 and 73, the synchronizer 41 for first and second speed gears, and meshing engagements of the gears in the gear trains G1, G2, and GR for first and second speed gears and reverse gear.

Figure 3:
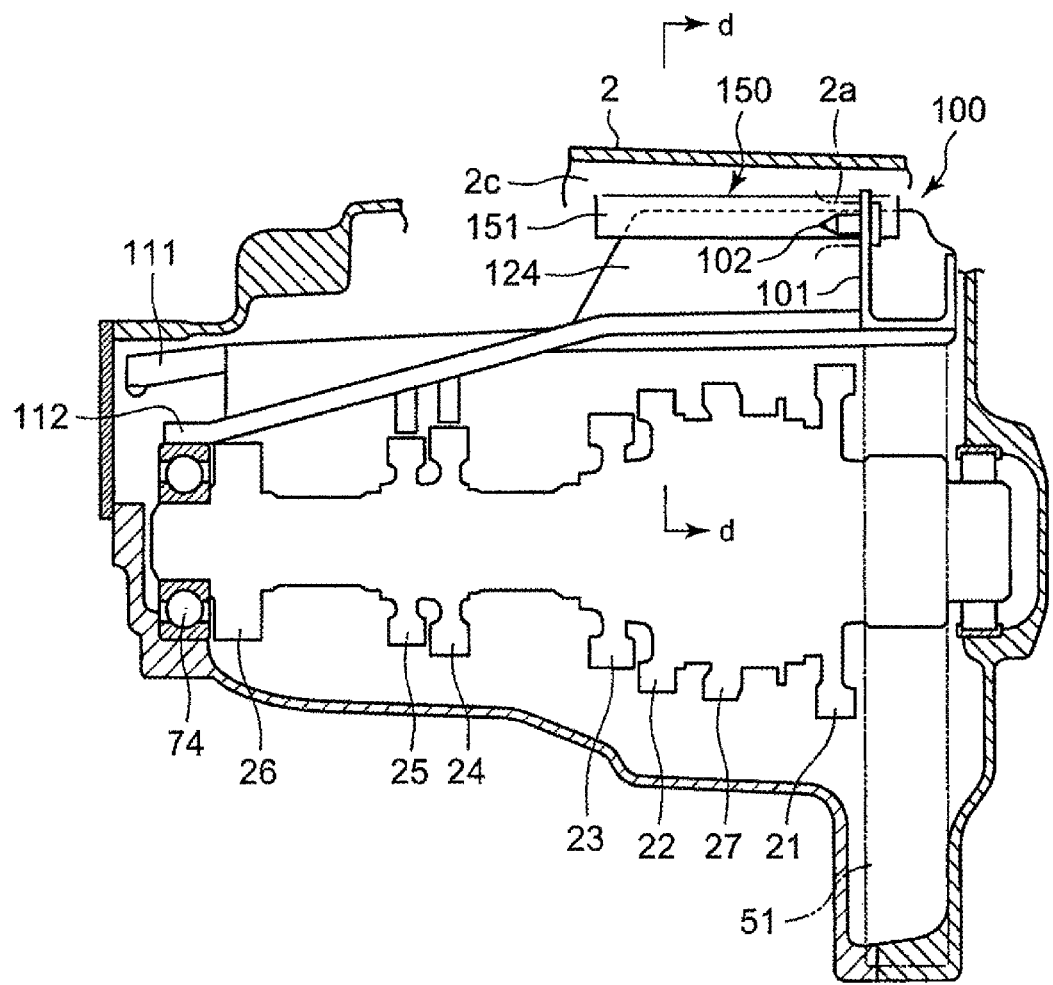
FIG. 3 is a general side view of the transmission.

As illustrated in FIGS. 2 and 3, this lubricating structure includes an oil-feeding member 100 arranged in the case 2 and made of resin. This oil-feeding member 100 is arranged in the space above the respective gears on the secondary shaft 20 and the differential ring gear 51, and extends in the axial direction of the transmission 1. The oil-feeding member 100 has a front end portion. The front end portion is supported by the case 2 with an attaching pin 102 press-fitted from the front side into a hole of a boss 2a provided for a front wall part of the case 2. The attaching pin 102 projects toward the rear to a vertical wall face 101 provided for the front end. The oil-feeding member 100 has a rear end portion. The rear end portion is supported by the case 2 when the tip portions of a first oil feeder 111 and a second oil feeder 112 protruding toward the rear are engaged with the rear wall 2b of the case 2. Note that the structures of the tip portions of the first and second oil feeders 111 and 112 will be described in detail later.

Figure 4:
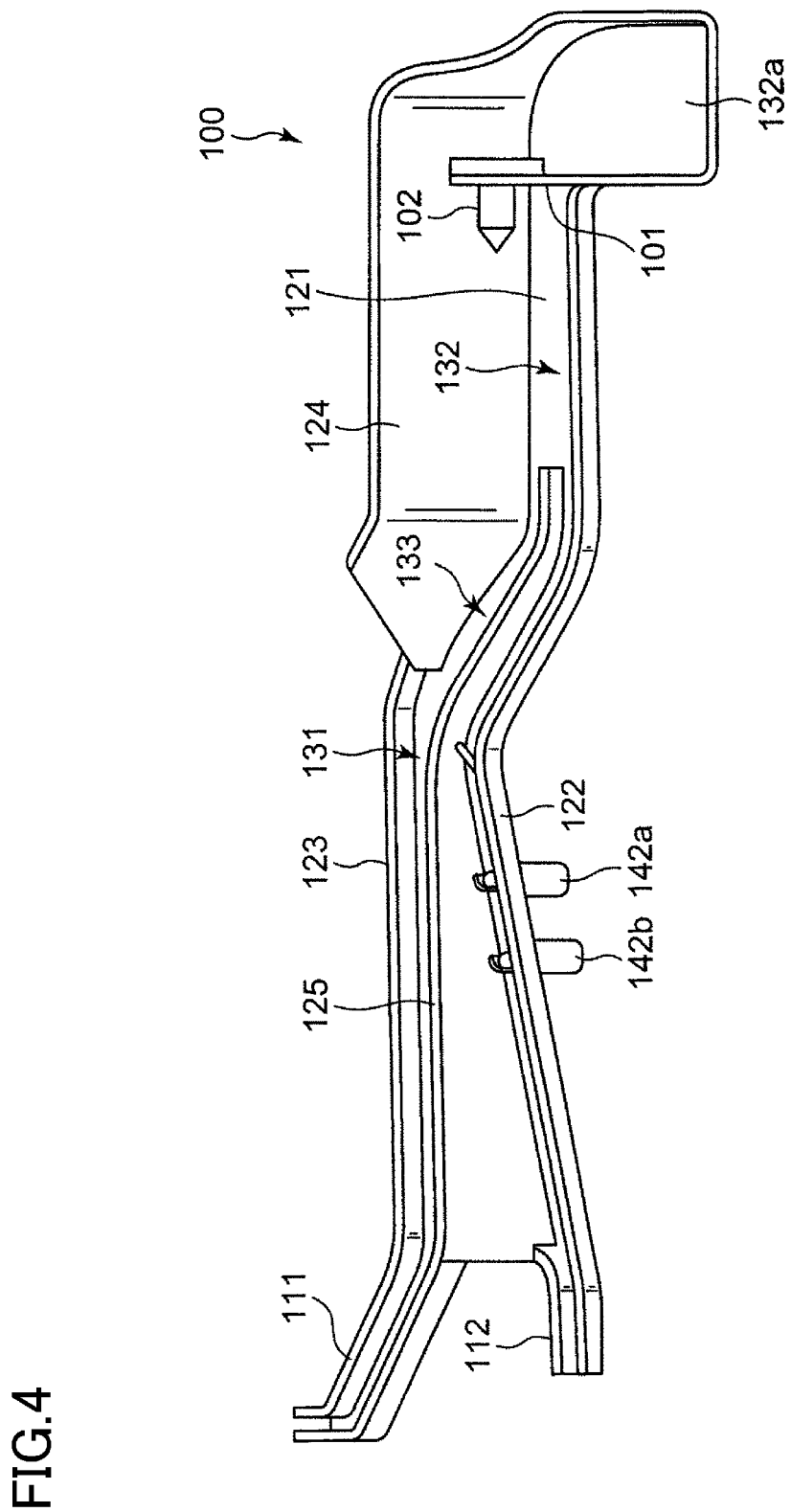
FIG. 4 is a perspective view illustrating the oil-feeding member.
Figure 5:
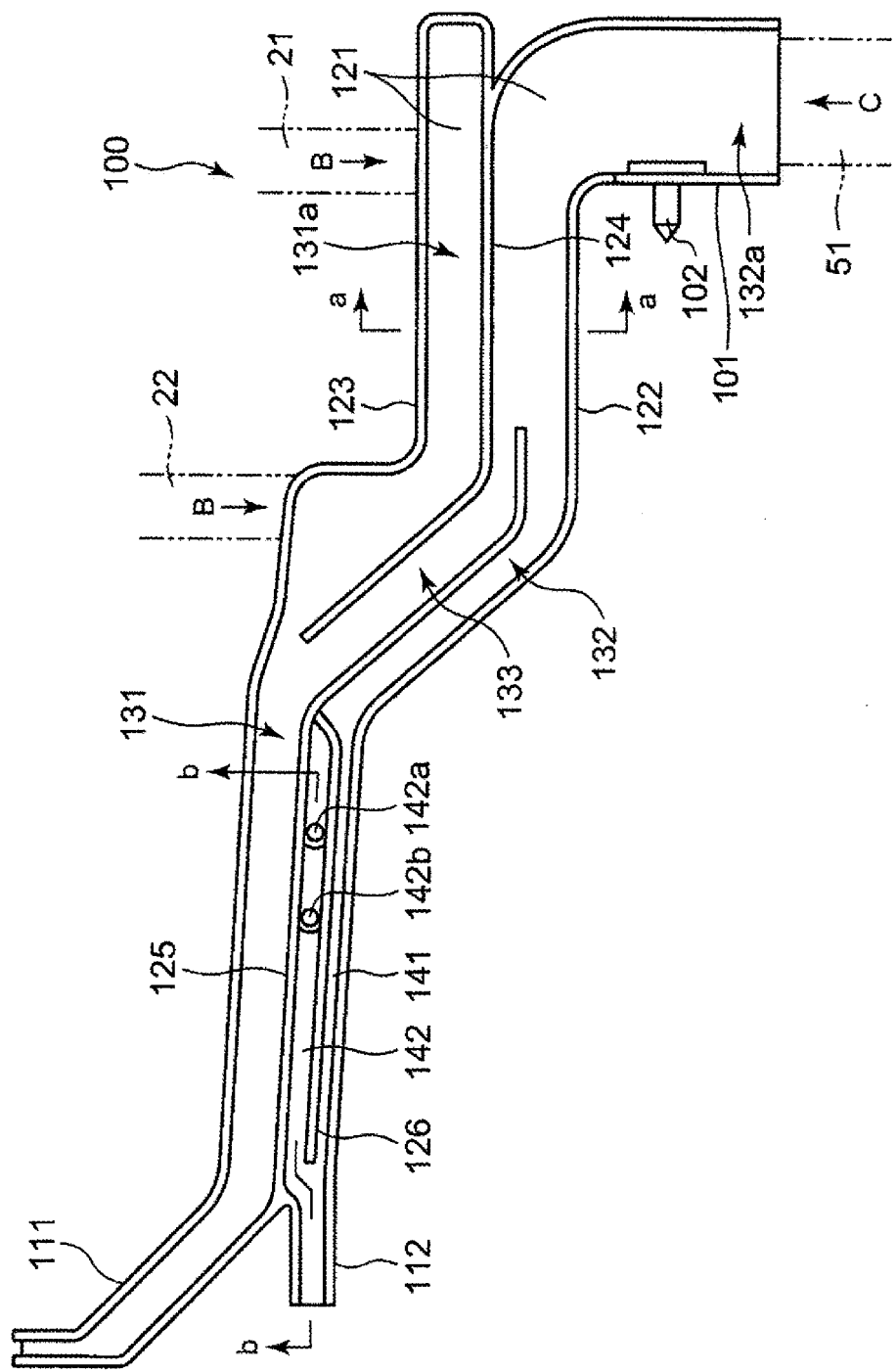
FIG. 5 is a plan view illustrating the oil-feeding member.
Figure 6:
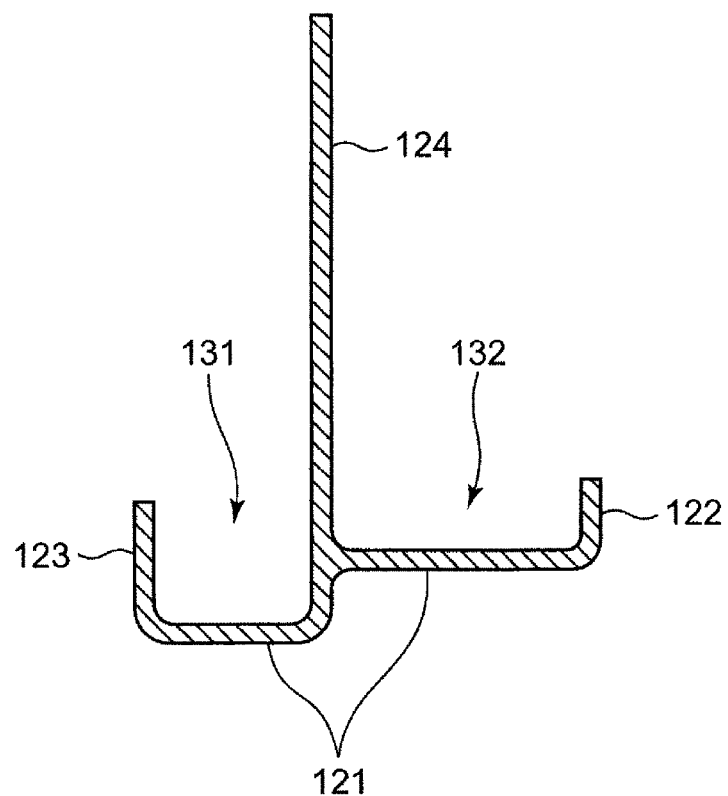
FIG. 6 is an enlarged cross-sectional view of the oil-feeding member taken along the plane a-a shown in FIG. 5.

As illustrated in FIGS. 4 to 6, the oil-feeding member 100 includes a bottom wall 121 that extends in the longitudinal direction of the oil-feeding member 100, and side walls 122 and 123, each of which stands upward from an associated one of the end portions of the bottom wall 121 in the width direction. The oil-feeding member 100 is formed in the shape of a gutter to guide oil from the front end (i.e., one end of the transmission 1 in the axial direction) toward the rear end (i.e., the other end of the transmission in the axial direction). Note that the left- and right-hand sides when the oil-feeding member 100 is viewed from a point upstream in the oil flowing direction (i.e., the right-hand side of FIGS. 4 and 5) will be hereinafter simply referred to as the "left side" and "right side", respectively.

In a portion of the oil-feeding member 100 between the side walls 122 and 123 on the left and right sides, a catching wall 124 and a partition wall 125 are provided. The catching wall 124 is a tall projecting wall that runs from the front end portion toward a longitudinal middle portion of the oil-feeding member 100. The partition wall 125 runs from the longitudinal middle portion to the rear end portion of the oil-feeding member 100 to divide the bottom wall 121 horizontally. In the oil-feeding member 100, a first gutter 131 and a second gutter 132 are defined as follows. The first gutter 131 is a portion defined (i) between the catching wall 124 and the side wall 123 on the right side and (ii) between the partition wall 125 and the side wall 123 on the right side. The second gutter 132 is a portion defined (i) between the catching wall 124 and the side wall 122 on the left side and (ii) between the partition wall 125 and the side wall 122 on the left side. Thus, the first and second gutters 131 and 132 are arranged side by side in the horizontal direction (i.e., in the width direction of the first and second gutters 131 and 132), and the catching wall 124 stands between the first and second gutters 131 and 132.

Moreover, a rear portion of the catching wall 124 and a front portion of the partition wall 125 are arranged to overlap with each other in the longitudinal direction of the oil-feeding member 100 (i.e., positioned to overlap with each other when viewed in the horizontal direction of the oil-feeding member 100). The rear portion of the catching wall 124 is positioned on the right side, while the front portion of the partition wall 125 is positioned on the left side. The portion of the oil-feeding member 100 between the overlapping portions—the rear portion of the catching wall 124 and the front portion of the partition wall 125—is defined as a communicating passage 133 that branches from the second gutter 132 and is connected to the first gutter 131.

The first gutter 131 on the right side has an upstream end portion serving as a first oil introducing portion 131a. Arranged beside a portion of the first oil introducing portion 131a with the first gutter 131 (beside the right side of the first oil introducing portion 131a) are the secondary gears 21 and 22 for first and second speed gears on the secondary shaft 20. The first oil introducing portion 131a is positioned above the secondary gears 21 and 22 for first and second speed gears and on the advancing side of the rotating direction B (i.e., on the left side) with respect to upper portions of both of these secondary gears 21 and 22 (see FIG. 5). The catching wall 124 catches the oil picked up by the secondary gears 21 and 22 for first and second speed gears (and the secondary gear 27 for reverse gear when the vehicle is moving forward), and guides the oil to the first oil introducing portion 131a of the first gutter 131.

Moreover, the second gutter 132 on the left side has an upstream end portion serving as a second oil introducing portion 132a that is bent to the left and of which the tip end is open. The differential ring gear 51 is positioned beside a portion of the second oil introducing portion 132a closer to the second gutter 132 (i.e., beside the left side of the second oil introducing portion 132a). The second oil introducing portion 132a is positioned above the differential ring gear 51 and on the advancing side of the rotating direction C (i.e., on the right side) when the vehicle is moving forward with respect to an upper portion of the differential ring gear 51 (see FIG. 5). The catching wall 124 also catches the oil picked up by the differential ring gear 51 and spattered over the second oil introducing portion 132a, and guides the oil to the vicinity of the second oil introducing portion 132a of the second gutter 132 (i.e., a portion on the left side of the catching wall 124).

As illustrated in FIG. 4, the first gutter 131 is provided substantially horizontally. In comparison, the second gutter 132 is sloped such that the closer to the rear end, the lower the level of a downstream portion of the second gutter 132 gets. Accordingly, the closer to the rear end, the greater the vertical length of the partition wall 125 gets to close the gap between the first and second gutters 131 and 132.

The first and second gutters 131 and 132 each have a rear end portion connected to an associated one of the first and second oil feeders 111 and 112. The first oil feeder 111 is bent to the right to point to the rear end portion of the primary shaft 10. The second oil feeder 112 extends toward the rear to point to the rear end portion of the secondary shaft 20.

Next, it will be described in detail how the first and second oil feeders 111 and 121 feed oil to the rear end portions of the shafts 10 and 20.

Figure 7:
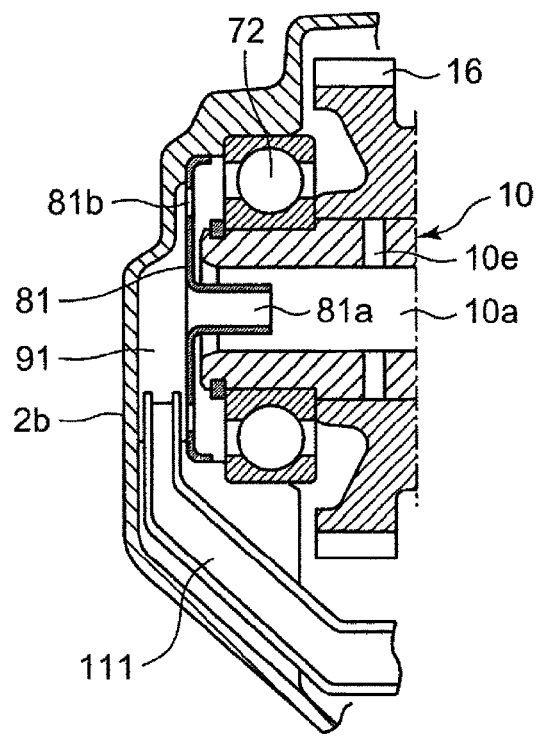
FIG. 7 is a cross-sectional top view of an oil feeding structure provided on a primary shaft side at the back end of the transmission.

First, the oil feeding structure provided for the primary shaft 10 includes: a funnel 81 between a bearing 72 that supports the rear end portion of the primary shaft 10 and the rear wall 2b of the case 2 behind the bearing 72; and an oil reservoir 91 that is the space between the funnel 81 and the rear wall 2b of the case 2 as shown in FIG. 7. In the middle of the funnel 81, a tube portion 81a is inserted from the rear side into an intra-shaft oil passage 10a of the primary shaft 10. The funnel 81 also has communicating holes 81b on its peripheral flange portion.

The first oil feeder 111 of the oil-feeding member 100 has its tip portion inserted into the oil reservoir 91 from beside the reservoir 91. This allows the oil that has flowed through the first gutter 131 of the oil-feeding member 100 to be fed from the first oil feeder 111 to the oil reservoir 91. The oil fed into the oil reservoir 91 is introduced from the oil reservoir 91 through the tube portion 81a of the funnel 81 into the intra-shaft oil passage 10a of the primary shaft 10. The oil fed into the oil reservoir 91 also passes through the communicating holes 81b, and is fed into the bearing 72. The oil introduced into the intra-shaft oil passage 10a flows through the radially extending oil passages 10b to 10e, and is fed to, and lubricates, each of the loosely-fitting engagements between the primary shaft 10 and the primary gears 13 to 16 for third to sixth speed gears. The oil introduced into the intra-shaft oil passage 10a also lubricates, for example, the sliding surfaces of the synchronizers 42 and 43 for third and fourth speed gears and for fifth and sixth speed gears. Furthermore, the oil fed to the bearing 72 is supplied from the bearing 72 to a gear-tooth surface of the primary gear 16 for sixth speed gear adjacent to the front end of the bearing 72. Here, the gear-tooth surface is a meshing engagement between the primary gear 16 for sixth speed gear and the secondary gear 26 for sixth speed gear. Hence, the first gutter 131 is configured to feed the oil to parts to be lubricated on the primary shaft 10. Here, the parts to be lubricated include: the bearing 72; the loosely-fitting engagements between the primary shaft 10 and the primary gears 13 to 16 for third to sixth speed gears; the sliding surfaces of the synchronizers 42 and 43 for third and fourth speed gears and for fifth and sixth speed gears; and the gear-tooth surface of the primary gear 16 for sixth speed gear.

Figure 8:
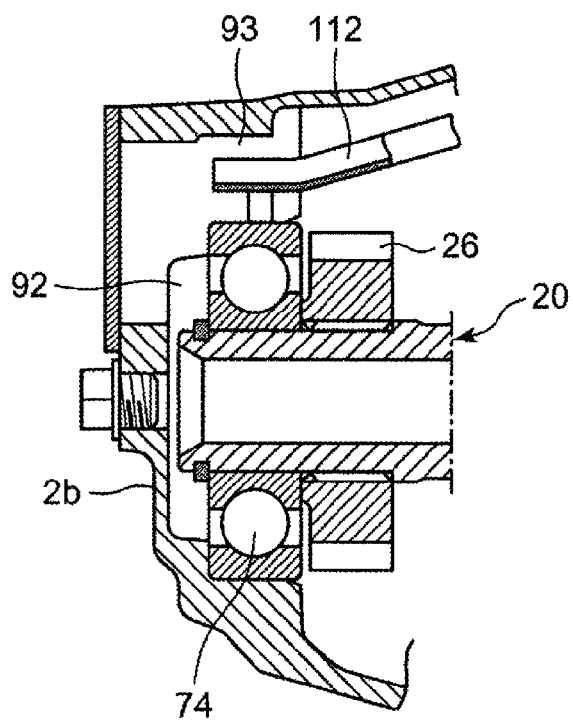
FIG. 8 is a cross-sectional side view of the oil feeding structure provided on a secondary shaft side at the back end of the transmission.

Next, the oil feeding structure provided for the secondary shaft 20 will be described. As illustrated in FIG. 8, an oil reservoir 92 is provided between a bearing 74 that supports the rear end portion of the secondary shaft 20 and the rear wall 2b of the case 2 behind the bearing 74. Above the bearing 74, there is an opening 93 that communicates with the oil reservoir 92. The opening 93 is created by cutting a fitting hole that fits the case 2 into the bearing 74. The second oil feeder 112 of the oil-feeding member 100 is inserted from the front side into the opening 93. This allows the oil that has flowed through the second gutter 132 to be fed from the second oil feeder 112 to the oil reservoir 92. The oil fed into the oil reservoir 92 is then fed from the oil reservoir 92 to the bearing 74. Furthermore, the oil fed to the bearing 74 is supplied from the bearing 74 to a gear-tooth surface of the secondary gear 26 for sixth speed gear adjacent to the front end of the bearing 74. Here, the gear-tooth surface is a meshing engagement between the secondary gear 26 for sixth speed gear and the primary gear 16 for sixth speed gear. Hence, the second gutter 132 is configured to feed the oil to parts to be lubricated on the secondary shaft 20. Here, the parts to be lubricated include the bearing 74, and the gear-tooth surface of the secondary gear 26 for sixth speed gear. Note that the second gutter 132 is configured to allow the oil dripping holes 142a and 142b (to be described later) to feed the oil to the gear-tooth surfaces of the secondary gears 24 and 25 for fourth and fifth speed gears serving as parts to be lubricated on the secondary shaft 20.

The tip portion of the first oil feeder 111 is engaged with the oil reservoir 91 from beside the reservoir 91, which regulates an axial position of the oil-feeding member 100. The tip portion of the second oil feeder 112 gets engaged with the opening 93 from the front side, which regulates the horizontal position of a rear portion of the oil-feeding member 100.

Moreover, as illustrated in FIG. 5, the oil-feeding member 100 further includes a rib 126, which is arranged on a sloped bottom of a downstream portion of the second gutter 132. This rib 126, extended from its front end portion connected to the partition wall 125, runs between the partition wall 125 and the side wall 122 on the left side to reach the vicinity of the second oil feeder 112. This rib 126 divides the bottom of the second gutter 132 into a first bottom portion 141 and a second bottom portion 142.

The second bottom portion 142 is provided between the partition wall 125 and the rib 126, and extends from a longitudinal middle portion of the second gutter 132 to the vicinity of the second oil feeder 112 (i.e., near the rear end of the second gutter 132). The first bottom portion 141 is the rest of the bottom of the second gutter 132 other than the second bottom portion 142. In a downstream portion of the second gutter 132, the first bottom portion 141 is provided between the side wall 122 on the left side and the rib 126. The downstream ends of the first and second bottom portions 141 and 142 are confluent with each other and continuous with the second oil feeder 112.

Figure 9:
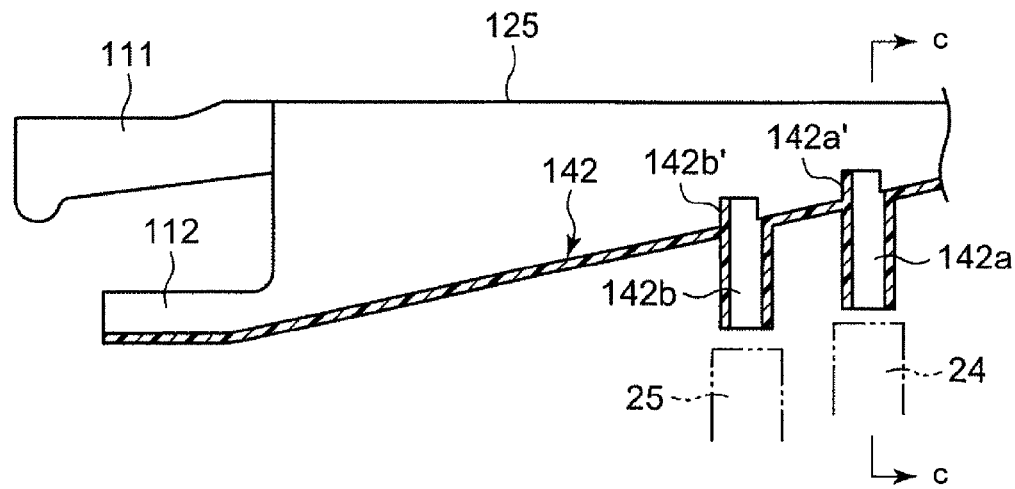
FIG. 9 is an enlarged cross-sectional view of the oil-feeding member taken along the plane b-b shown in FIG. 5.
Figure 10:
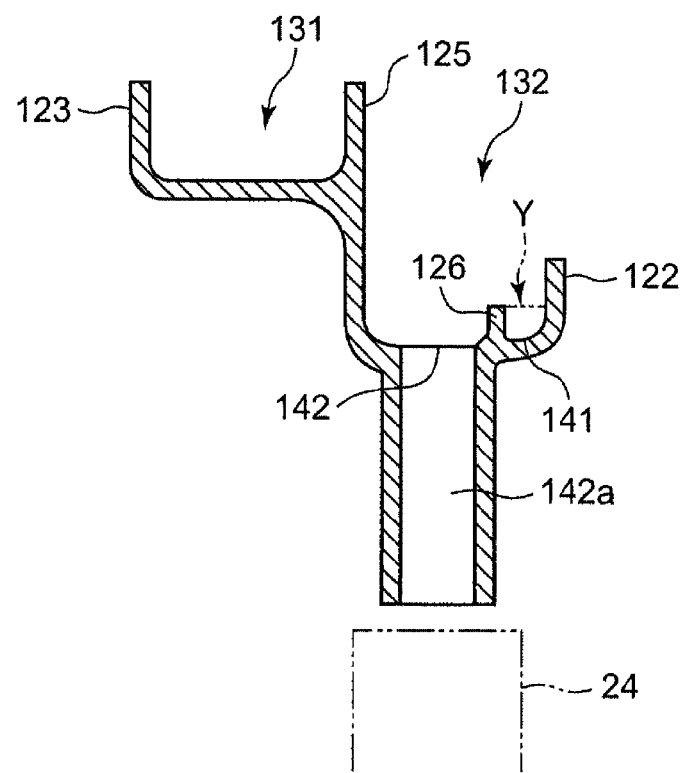
FIG. 10 is an enlarged cross-sectional view of the oil-feeding member taken along the plane c-c shown in FIG. 9.

As illustrated in FIGS. 9 and 10, the second bottom portion 142 is provided with oil-dripping holes 142a and 142b. The oil-dripping holes 142a and 142b are positioned above the secondary gears 24 and 25 for fourth and fifth speed gears, respectively, and allow oil, flowing on the second bottom portion 142, to drip downward.

Here, as indicated by the reference sign Y in FIG. 10, the height of the rib 126 is defined such that the oil flowing on the first bottom portion 141 of the second gutter 132 will overflow into the second bottom portion 142 when the amount of the flowing oil exceeds a preset amount. Thus, the oil drips downward from the second bottom portion 142 through the oil-dripping holes 142a and 142b when the amount of the oil flowing on the first bottom portion 141 of the second gutter 132 exceeds the preset amount.

Note that, as illustrated in FIG. 9, dams 142a' and 142b' are respectively provided downstream of the rim portions of the openings of the oil-dripping holes 142a and 142b. These dams 142a' and 142b' catch the oil flowing on the sloped second bottom portion 142, and allow the oil to drip downward through the respective oil-dripping holes 142a and 142b.

Figure 11:
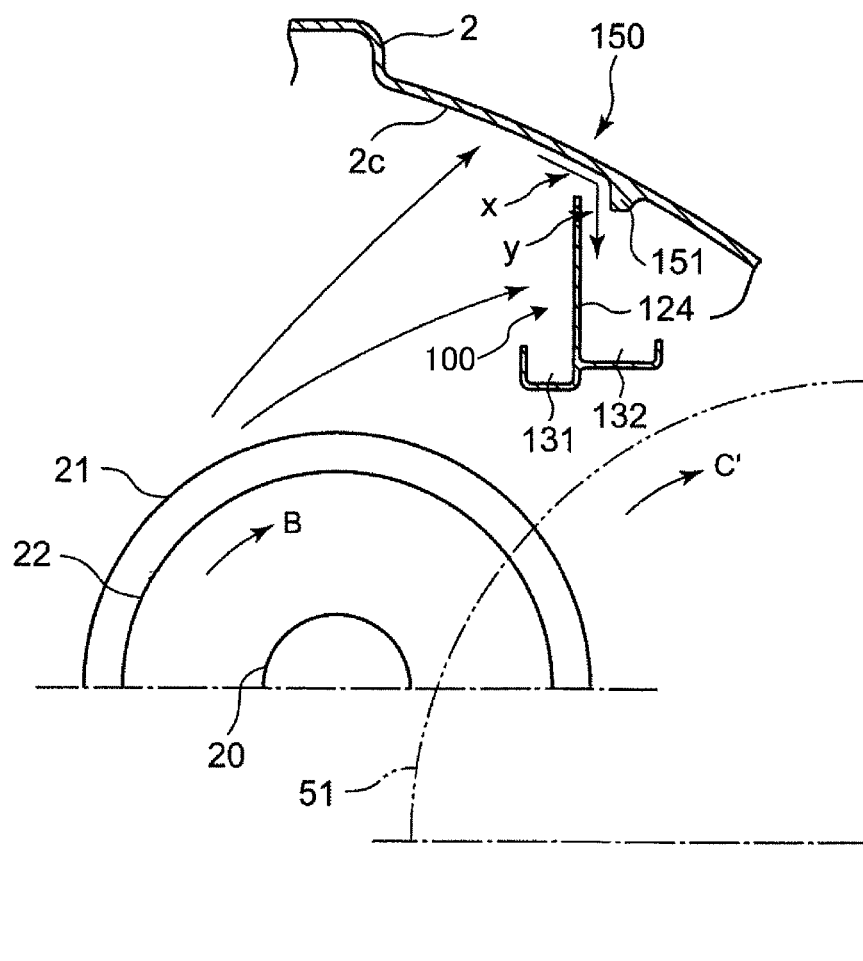
FIG. 11 is a general cross-sectional view of a top portion of a transmission case taken along the plane d-d shown in FIG. 3.

In addition to this structure, the case 2 of this embodiment further includes a guiding portion 150 that guides oil, deposited on the ceiling surface 2c of the case 2, to the second gutter 132 of the oil-feeding member 100 as illustrated in FIG. 11. Specifically, the secondary gears 21, 22 and 27 for first and second speed gears, and reverse gear (or the secondary gears 21 and 22 for first and second speed gears when the vehicle is moving backward) pick up oil. Then, a part of the oil picked up spatters toward, and gets deposited on, the ceiling surface 2c of the case 2. Then, the guiding portion 150 guides the oil deposited on the ceiling surface 2c to the second gutter 132.

Specifically, the guiding portion 150 includes the ceiling surface 2c of the case 2 and a rib 151. The ceiling surface 2c is sloped so as to be gradually lowered from the secondary shaft 20 above the oil-feeding member 100 toward the differential ring gear 51. The rib 151 projects downward from the ceiling surface 2c.

As illustrated in FIG. 3, the rib 15 is provided for the ceiling surface 2c above the second gutter 132 of the oil-feeding member 100, and extends in the axial direction of the transmission 1 so as to cover the range from the secondary gears 21 and 22 for first and second speed gears through the secondary gear 27 for reverse gear.

Further, a gap x is left between an upper end of the catching wall 124 of the oil-feeding member 100 and the ceiling surface 2c of the case 2, and a gap y is left between the rib 151 and an upper end portion of the catching wall 124. In this manner, the guiding portion 150 defines an oil flow path which runs from the ceiling surface 2c on which oil is deposited to the second gutter 132 via the gaps x and y.

Note that the front and rear end portions of the oil-feeding member 100 are supported by the case 2; however, the longitudinal middle portion of the oil-feeding member 100 is not supported by the case 2. Hence, the oil-feeding member 100 is suspended over an upper portion of the case 2. Considering such a suspended state and various factors such as the dimensional tolerance of each part of the oil-feeding member 100 and the case 2, and the surface roughness of the ceiling surface 2c of the case 2, the oil-feeding member 100 needs to be provided such that an upper end of the catching wall 124 does not contact with the ceiling surface 2c. This inevitably creates a gap between the upper end of the catching wall 124 and the ceiling surface 2c. Consequently, it can be said that the guiding portion 150 takes advantage of the gap x thus left.

Next, it will be described exactly how the lubricating structure according to this embodiment works.

As illustrated in FIGS. 2 and 5, the secondary shaft 20 rotates in the direction B and the differential ring gear 51 of the differential gear system 50 rotates in the direction C, when the vehicle is moving forward. As the differential ring gear 51 rotates in the direction C, the oil stored on the bottom of the case 2 gets held on and picked up by the gear-tooth surfaces of the differential ring gear 51, and spattered from an upper portion of the differential ring gear 51 toward the secondary shaft 20.

Then, the spattered oil is introduced into the second oil introducing portion 132a of the second gutter 132 in the oil-feeding member 100. In addition, the oil spattered by the differential ring gear 51 over the second oil introducing portion 132a is caught by a surface of the catching wall 124 that faces the differential ring gear 51 (i.e., the surface in contact with the second gutter 132) in front of the second oil introducing portion 132a. Then, the oil flows downward along the surface, and is introduced to the vicinity of the second oil introducing portion 132a of the second gutter 132, that is, a left side portion of the catching wall 124.

Moreover, the secondary gears 21, 22 and 27 for first and second speed gears, and reverse gear, which rotate in the direction B along with the secondary shaft 20, have their lower portions immersed in the oil on the bottom of the case 2. Hence, as these secondary gears 21, 22, and 27 rotate, the oil gets picked up and spattered toward the differential ring gear 51. Then, the spattered oil is caught on a surface of the catching wall 124 that faces the secondary shaft 20 (i.e., the surface in contact with the first gutter 131) in front of the oil. Then, the oil flows downward along the surface, and is introduced into the first oil introducing portion 131a of the first gutter 131.

In the meantime, as illustrated in FIG. 11, a part of the oil picked up by the secondary gears 21, 22 and 27 for first and second speed gears, and reverse gear spatters toward the ceiling surface 2c of the case 2, and gets deposited on the ceiling surface 2c. Then, the oil deposited is introduced by the guiding portion 150 into the second gutter 132 of the oil-feeding member 100.

Specifically, the oil spattered by the secondary gears 21, 22, and 27 and deposited on the ceiling surface 2c flows along the sloped ceiling surface 2c toward the second gutter 132, runs through the gap x between the ceiling surface 2c of the guiding portion 150 and the upper end of the catching wall 124, and reaches a side surface of the rib 151. Then, the oil flows from the side surface of the rib 151 through the gap y, drips onto the second gutter 132, and is introduced into the second gutter 132.

A part of the oil thus introduced into the second gutter 132 flows into the first gutter 131 through the communicating passage 133. The rest of the oil flows toward the rear inside the second gutter 132.

The oil that has come from the first oil introducing portion 131a of the first gutter 131 and the oil that has flowed into the first gutter 131 from the second gutter 132 through the communicating passage 133 flow toward the rear inside the first gutter 131. The oil is then fed from the first oil feeder 111 connected to the rear end of the first gutter 131 to the oil reservoir 91 positioned behind the primary shaft 10. A part of the oil fed to the oil reservoir 91 flows from the oil reservoir 91 through the communicating hole 81b on the funnel 81. Then, the oil is fed to the bearing 72 that supports the rear end portion of the primary shaft 10, and then lubricates this bearing 72 and a meshing engagement between the primary gear 16 for sixth speed gear and the secondary gear 26 for sixth speed gear that are adjacent to the front end of the bearing 72.

Meanwhile, the rest of the oil fed to the oil reservoir 91 is introduced through the tube portion 81a of the funnel 81 into the intra-shaft oil passage 10a of the primary shaft 10. Then, the rest of the oil flows from the intra-shaft oil passage 10a through the radially extending oil passages 10b to 10e. Then, the oil is fed to, and lubricates, the loosely fitting engagements between the primary shaft 10 and the primary gears 13 to 16 for third to sixth speed gears. The rest of the oil also lubricates, for example, sliding surfaces of the synchronizers 42 and 43 for third and fourth speed gears and for fifth and sixth speed gears.

Furthermore, the secondary gear 22 for second speed gear picks up oil to feed the oil to a gear-tooth surface of the secondary gear 23 for third speed gear, too, which is located adjacent to the rear of the secondary gear 22 for second speed gear. Here, the gear-tooth surface is a meshing engagement between the secondary gear 23 for third speed gear and the primary gear 13 for third speed gear. Then, the oil lubricates the meshing engagement.

On the other hand, the oil that has been introduced into the second gutter 132 and that has not flowed into the communicating passage 133 flows toward the rear along the second gutter 132. Here, the bottom of the second gutter 132 is divided by the rib 126 into the first and second bottom portions 141 and 142 as described above. The oil that has been introduced into the second gutter 132 and that has not flowed into the communicating passage 133 basically flows on the first bottom portion 141. However, if the amount of the oil flowing on the first bottom portion 141 is greater than the preset amount, the oil runs over the rib 126 and overflows toward the second bottom portion 142. As a result, the oil that has been introduced into the second gutter 132 and that has not flowed into the communicating passage 133 flows on the first and second bottom portions 141 and 142.

When the vehicle is moving forward, the second gutter 132 receives much oil picked up by the differential ring gear 51, in addition to the oil picked up as described above by the secondary gears 21 22, and 27 for first and second speed gears, and reverse gear and introduced via the guiding portion 150 provided on a ceiling portion of the case 2. Here, the differential ring gear 51 is immersed deep into the oil on the bottom of the case 2, and has a greater face width than a speed change gear. As a result, the amount of oil caught by the oil-feeding member 100 exceeds the predetermined amount. At this point in time, the amount of the oil flowing on the first bottom portion 141 of the second gutter 132 exceeds the preset amount. Consequently, the oil flowing on the first bottom portion 141 runs over the rib 126 and overflows toward the second bottom portion 142. Therefore, the oil that has been introduced into the second gutter 132 and that has not flowed into the communicating passage 133 flows downstream through both of the first and second bottom portions 141 and 142.

The two oil flows that have run on the first and second bottom portions 141 and 142 are confluent with each other at a point before the second oil feeder 112, and then, the oil is introduced from the second oil feeder 112 into the oil reservoir 92 positioned behind the secondary shaft 20 as illustrated in FIG. 8. The oil is then fed from the oil reservoir 92 to, and lubricates, the bearing 74 that supports the rear end portion of the secondary shaft 20. Meanwhile, the oil that has passed through the bearing 74 is fed to the secondary gear 26 for sixth speed gear, and lubricates the meshing engagement between the primary gear 16 for sixth speed gear and the secondary gear 26 for sixth speed gear.

A part of the oil that has overflowed toward the second bottom portion 142 drips through the oil-dripping holes 142a and 142b, which are cut through the second bottom portion 142, onto the gear-tooth surfaces of the secondary gears 24 and 25 for fourth and fifth speed gears located under the oil-dripping holes 142a and 142b. This dripping oil lubricates a meshing engagement between the primary gear 14 for fourth speed gear and the secondary gear 24 for fourth speed gear, and a meshing engagement between the primary gear 15 for fifth speed gear and the secondary gear 25 for fifth speed gear. In this case, dams 142a' and 142b' are respectively provided on the rim portions of the openings of the oil-dripping holes 142a and 142b of the second bottom portion 142, thus ensuring that a required amount of oil is fed to each meshing engagement.

In this manner, when the vehicle is moving forward, the oil is fed to, and lubricates, the meshing engagements of respective gears included in the gear trains for third, fourth, fifth and sixth speed gears G3, G4, G5 and G6 that are arranged from an axial intermediate portion toward the rear end of the transmission 1 and that often get ready to transmit power, the synchronizer 42 for third and fourth speed gears and the synchronizer 43 for fifth and sixth speed gears that also often get ready to transmit power, and the bearings 72 and 74 that respectively support the rear end portions of the primary and secondary shafts 10 and 20 to transmit power.

On the other hand, when the vehicle is moving backward, the differential ring gear 51 rotates in the direction C' as illustrated in FIGS. 2 and 11, and spatters the oil in the opposite direction from the one in which the oil-feeding member 100 is arranged. Hence, the oil picked up by the rotating differential ring gear 51 is not caught by the oil-feeding member 100. Thus, when the vehicle is moving backward, the oil-feeding member 100 catches the only oil picked up by the secondary gears 21 and 22 for first and second speed gears rotating in the same direction as when the vehicle is moving forward. In this case, the amount of the oil introduced into the oil-feeding member 100 decreases significantly compared to when the vehicle is moving forward. Specifically, the amount of the oil caught by the oil-feeding member 100 becomes smaller than the predetermined amount.

The oil picked up by the rotating secondary gears 21 and 22 for first and second speed gears and spattered toward the oil-feeding member 100 gets deposited on a surface of the catching wall 124 of the oil-feeding member 100 in contact with the first gutter 131. Then, the oil runs downward along the surface, enters the first gutter 131, flows toward the rear through the first gutter 131, and then is fed from the first oil feeder 111 to the oil reservoir 91 behind the primary shaft 10.

Then, in the same way as when the vehicle is moving forward, part of the oil fed to the oil reservoir 91 is fed through the communicating hole 81b of the funnel 81 to bearing 72. Then, the oil lubricates the bearing 72, and the meshing engagement between the primary gear 16 for sixth speed gear and the secondary gear 26 for sixth speed gear.

The rest of the oil fed to the oil reservoir 91 flows from the tube portion 81a of the funnel 81 through the intra-shaft oil passage 10a of the primary shaft 10 and the oil passages 10b to 10e. Then, the rest of the oil is fed to, and lubricates, the loosely-fitting engagements of the primary gears 13 to 16 for third to sixth speed gears for the primary shaft 10, and the sliding surfaces of the synchronizer 42 for third and fourth speed gears and the synchronizer 43 for fifth and sixth speed gears.

A part of the oil picked up by the rotating secondary gears 21 and 22 for first and second speed gears and spattered toward the oil-feeding member 100 gets deposited on the ceiling surface 2c of the case 2. Then, the oil is introduced as described above by the guiding portion 150 into the second gutter 132 of the oil-feeding member 100.

In this case, the oil that flows on the first bottom portion 141 of the second gutter 132 is just the oil (i) picked up by the secondary gears 21 and 22 for first and second speed gears, (ii) deposited on the ceiling surface 2c of the case 2, (iii) introduced into the second gutter 132 via the guiding portion 150, and (iv) not supplied into the communicating passage 133. Thus, the amount of the oil that flows on the first bottom portion 141 of the second gutter 132 becomes smaller than or equal to the preset amount. As a result, the oil that flows on the first bottom portion 141 will not run over the rib 126 and overflow toward the second bottom portion 142.

Consequently, no oil drips through the oil-dripping holes 142a and 142b of the second bottom portion 142, and therefore, no oil is fed to the meshing engagement between the primary gear 14 for fourth speed gear and the secondary gear 24 for fourth speed gear or to the meshing engagement between the primary gear 15 for fifth speed gear and the secondary gear 25 for fifth speed gear. When the vehicle is moving backward, however, these gears meshing with each other are simply idling without transmitting power. This eliminates the need for feeding oil to these meshing engagements, and thus causes no problem due to insufficient oil feeding.

On the other hand, the oil that has flowed on the first bottom portion 141 of the second gutter 132 is fed through the second oil feeder 112 to the bearing 74, which supports the rear end portion of the secondary shaft 20 that is rotating and transmitting power when the vehicle is moving backward as well as forward.

Thus, according to this embodiment, when the vehicle is moving forward, the oil is introduced from the differential ring gear 51 and the secondary gears 21, 22, and 27 for first and second speed gears and reverse gear into the first gutter 131 and the second gutter 132 of the oil feeding member 100 and a part of the oil, introduced in large amount from the differential ring gear 51 into the second gutter 132, flows from the second gutter 132 through the communicating passage 133 into the first gutter 131. This thus allows for feeding a sufficient amount of oil to parts to be lubricated located at a portion in, and closer to the rear end of, the transmission case 2 (i.e., the parts to be lubricated located, on the primary shaft 10 and the secondary shaft 20, in the middle to rear end portions of the transmission 1 in the axial direction).

Moreover, when the vehicle is moving backward, the oil picked up by the secondary gears 21 and 22 for first and second speed gears and caught by the catching wall 124 is fed through the first gutter 131 to the parts to be lubricated on the primary shaft 10. Here, when the vehicle is moving backward, just the oil picked up by the secondary gears 21 and 22 for first and second speed gears (i.e., speed change gears) may be fed as described above. Hence, in order to feed the oil to the parts to be lubricated on the secondary shaft 20 as well as those on the primary shaft 10, the oil introduced into, for example, the first gutter 131 is directed to the second gutter 132. However, if the oil is directed from the first gutter 131 to the second gutter 132, only a decreased amount of oil will be fed to the parts to be lubricated on the primary shaft 10, since the secondary gears 21 and 22 for first and second speed gears pick up just a little oil. In order to make up for such shortage of oil, an increased amount of oil could be stored on the bottom of the transmission case and picked up by the secondary gears 21 and 22 for first and second speed gears. However, the larger amount of oil stored on the bottom of the transmission case will not only cause an increase in the overall weight of the vehicle but also make the differential ring gear 51 and other members produce a greater oil agitation resistance.

According to this embodiment, the guiding portion 150 introduces, into the second gutter 132, the oil picked up by the secondary gears 21 and 22 for first and second speed gears and deposited on the ceiling surface 2c of the case 2. This thus reduces the need for increasing the amount of oil to be stored on the bottom of the case 2 in order to feed the oil to the parts to be lubricated on the secondary shaft 20 when the vehicle is moving backward, and also allows for feeding reliably a required amount of oil to the parts to be lubricated on the secondary shaft 20 as well as those on the primary shaft 10 while minimizing the amount of the oil stored there.

Moreover, the rib 151 in the guiding portion 150 is provided on the ceiling surface 2c above the second gutter 132 of the oil-feeding member 100, and extends in the axial direction of the transmission 1 so as to cover the range from the secondary gears 21 and 22 for first and second speed gears through the secondary gear 27 for reverse gear. This allows the rib 151 to be provided only at a necessary position, thus contributing to making the case 2 lighter, and eventually, reducing the overall weight of the vehicle.

Note that the secondary gears 21 and 22 for first and second speed gears rotate in the direction B when the primary shaft 10 is rotating even while the vehicle is at a stop. Hence, the oil is also fed to the parts to be lubricated on the secondary shaft 20 as well as those on the primary shaft 10 in the same way as when the vehicle is moving backward.

The present invention is not limited to the embodiments described above. Any modification may be readily made to the embodiments unless those modifications depart from the scope of the present invention as defined by the appended claims.

The embodiments described above are merely preferred examples in nature, and are not intended to limit the scope of the present invention. The scope of the present invention is defined only by the claims, and any modifications or changes that are deemed to be equivalent to any of those claims all fall within the scope of the present invention.

INDUSTRIAL APPLICABILITY

The present invention is useful as a structure for lubricating a transmission (in particular, a manual transmission) including an oil-feeding member arranged in a transmission case and catching the oil picked up by a gear.

DESCRIPTION OF REFERENCE CHARACTERS

1 Transmission
2 Transmission Case
2c Ceiling Surface
10 Primary Shaft
20 Secondary Shaft
100 Oil Feeding Member
124 Catching Wall
131 First Gutter
132 Second Gutter
133 Communicating Passage 150 Guiding Portion
151 Rib on Guiding Portion

The invention claimed is:

1. A structure for lubricating a transmission having an one end and an opposite end along an axial direction thereof, the structure comprising
an oil-feeding member arranged in a transmission case, and configured to catch oil picked up by a gear, wherein the oil feeding member is provided with a gutter and is configured to guide the oil through the gutter from said one end to the opposite end of the transmission in the axial direction and to feed the oil to a part to be lubricated located closer to the opposite end in the transmission case,
the gutter of the oil feeding member is comprised of a first gutter and a second gutter,
a portion of the oil feeding member closer to the one end is provided with a catching wall standing between the first and second gutters, the catching wall being configured to catch the oil picked up by a speed change gear and guide the oil into the first gutter, and the speed change gear being arranged beside the oil feeding member closer to the first gutter and serving as the gear,
the transmission case includes a guiding portion configured to guide, into the second gutter, the oil that the speed change gear has picked up which has been deposited on a ceiling surface of the transmission case and,
the ceiling surface of the transmission case is sloped downward from close to the first gutter towards the second gutter, and is provided with the guiding portion, the ceiling surface having the oil deposited thereon,
wherein said guiding portion includes a rib formed on the ceiling surface of the transmission case.

2. The structure of claim 1, wherein
the part to be lubricated includes a portion located on a primary shaft serving as an input shaft for the transmission, and a portion located on a secondary shaft extending parallel to the primary shaft,
the first gutter is configured to feed the oil to said portion located on the primary shaft, and
the second gutter is configured to feed the oil to said portion located on the secondary shaft.

3. The structure of claim 1, wherein
the speed change gear includes first and second speed gears on a secondary shaft extending parallel to a primary shaft serving as the input shaft of the transmission, and
the rib extends in the axial direction of the transmission in a range covering the first and second speed gears on the secondary shaft.

4. The structure of claim 1, wherein
a portion of the second gutter closer to the one end is provided with an oil introducing portion, into which introduced is the oil picked up by a differential ring gear located beside the oil feeding member and closer to the second gutter, and
the oil feeding member includes a communicating passage configured to guide a part of the oil into the first gutter, the oil having been introduced into the oil introducing portion of the second gutter.

5. The structure of claim 2, wherein
the speed change gear includes first and second speed gears on the secondary shaft extending parallel to the primary shaft serving as the input shaft of the transmission, and
the rib extends in the axial direction of the transmission in a range covering the first and second speed gears on the secondary shaft.

6. The structure of claim 2, wherein
a portion of the second gutter closer to the one end of the transmission is provided with an oil introducing portion, into which introduced is the oil picked up by a differential ring gear located beside the oil feeding member and closer to the second gutter, and
the oil feeding member includes a communicating passage configured to guide a part of the oil into the first gutter, the oil having been introduced into the oil introducing portion of the second gutter.

7. The structure of claim 3, wherein
a portion of the second gutter closer to the one end of the transmission is provided with an oil introducing portion, into which introduced is the oil picked up by a differential ring gear located beside the oil feeding member and closer to the second gutter, and
the oil feeding member includes a communicating passage configured to guide a part of the oil into the first gutter, the oil having been introduced into the oil introducing portion of the second gutter.

8. A structure for lubricating a transmission having an one end and an opposite end along an axial direction thereof, the structure comprising
an oil-feeding member arranged in a transmission case, and configured to catch oil picked up by a gear, wherein
the oil feeding member is provided with a gutter and is configured to guide the oil through the gutter from said one end to said opposite end of the transmission in the axial direction and to feed the oil to a part to be lubricated located closer to said opposite end in the transmission case,
the gutter of the oil feeding member is comprised of a first gutter and a second gutter,
a portion of the oil feeding member closer to the one end is provided with a catching wall standing between the first and second gutters, the catching wall being configured to catch the oil picked up by a speed change gear and guide the oil into the first gutter, and the speed change gear being arranged beside the oil feeding member closer to the first gutter and serving as the gear,
the transmission case includes a guiding portion configured to guide, into the second gutter, the oil that the speed change gear has picked up which has been deposited on a ceiling surface of the transmission case,
a portion of the second gutter closer to the one end is provided with an oil introducing portion, into which introduced is the oil picked up by a differential ring gear located beside the oil feeding member and closer to the second gutter, and
the oil feeding member includes a communicating passage configured to guide a part of the oil into the first gutter, the oil having been introduced into the oil introducing portion of the second gutter.

9. The structure of claim 8, wherein
the part to be lubricated includes a portion located on a primary shaft serving as an input shaft for the transmission, and a portion located on a secondary shaft extending parallel to the primary shaft,
the first gutter is configured to feed the oil to said portion located on the primary shaft, and
the second gutter is configured to feed the oil to said portion located on the secondary shaft.

10. The structure of claim 8, wherein
the speed change gear includes first and second speed gears on a secondary shaft extending parallel to a primary shaft serving as an input shaft of the transmission,
the guiding portion includes a rib provided on the ceiling surface of the transmission case, and
the rib extends in the axial direction of the transmission in a range covering the first and second speed gears on the secondary shaft.

11. The structure of claim 9, wherein
the speed change gear includes first and second speed gears on the secondary shaft extending parallel to the primary shaft serving as the input shaft of the transmission,
the guiding portion includes a rib provided on the ceiling surface of the transmission case, and
the rib extends in the axial direction of the transmission in a range covering the first and second speed gears on the secondary shaft.

\* \* \* \* \*